US011887541B2

(12) United States Patent
Uchida

(10) Patent No.: US 11,887,541 B2
(45) Date of Patent: Jan. 30, 2024

(54) FURTHER REDUCTION OF POWER CONSUMPTION IN DISPLAY DEVICE WITH LOW-FREQUENCY DRIVING

(71) Applicant: Sharp Kabushiki Kaisha, Sakai (JP)

(72) Inventor: Seiichi Uchida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/017,906

(22) PCT Filed: Aug. 3, 2020

(86) PCT No.: PCT/JP2020/029644
§ 371 (c)(1),
(2) Date: Jan. 25, 2023

(87) PCT Pub. No.: WO2022/029830
PCT Pub. Date: Feb. 10, 2022

(65) Prior Publication Data
US 2023/0274698 A1 Aug. 31, 2023

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0842* (2013.01);
(Continued)

(58) Field of Classification Search
CPC ............... G09G 3/3233; G09G 3/3266; G09G 2300/0842; G09G 2300/0861;
(Continued)

(56) References Cited

U.S. PATENT DOCUMENTS

| | | | | |
|---|---|---|---|---|
| 8,810,615 | B2 * | 8/2014 | Takahashi | G09G 3/3406 345/691 |
| 10,593,267 | B2 * | 3/2020 | Nishikawa | G09G 3/3233 |

(Continued)

FOREIGN PATENT DOCUMENTS

| | | | | |
|---|---|---|---|---|
| EP | 2698688 A1 * | 2/2014 | | G06F 3/041 |
| JP | 2001-184015 A | 7/2001 | | |

(Continued)

*Primary Examiner* — David D Davis
(74) *Attorney, Agent, or Firm* — Keating & Bennett, LLP

(57) ABSTRACT

A display device includes: a plurality of scanning lines; a plurality of data lines; a plurality of light-emission control lines; a plurality of pixel circuits each including a light-emitting element; a scanning line drive circuit that drives the scanning lines based on a first clock signal; a data line drive circuit that drives the data lines; a light-emission control line drive circuit that drives the light-emission control lines based on a second clock signal; and a display control circuit that outputs at least the first and second clock signals. The display control circuit classifies a frame period into a scanning period and a pause period, and during the pause period, the display control circuit stops the first clock signal and makes a frequency of the second clock signal lower than that during the scanning period. This further reduces the power consumption of the display device that performs low-frequency driving.

16 Claims, 14 Drawing Sheets

(52) U.S. Cl.
CPC ............... *G09G 2300/0861* (2013.01); *G09G 2310/0202* (2013.01); *G09G 2310/08* (2013.01); *G09G 2320/0626* (2013.01); *G09G 2330/021* (2013.01)

(58) Field of Classification Search
CPC ....... G09G 2310/0202; G09G 2310/08; G09G 2320/0626; G09G 2330/021
See application file for complete search history.

(56) References Cited

U.S. PATENT DOCUMENTS

| | | | | |
|---|---|---|---|---|
| 2012/0105390 | A1* | 5/2012 | Kim | G09G 3/3225 345/82 |
| 2016/0012774 | A1 | 1/2016 | Ohara et al. | |
| 2017/0124958 | A1* | 5/2017 | Pyo | G09G 3/3258 |
| 2019/0096330 | A1* | 3/2019 | Kim | G09G 3/3233 |
| 2020/0302875 | A1* | 9/2020 | Park | G09G 3/3275 |

FOREIGN PATENT DOCUMENTS

| | | | |
|---|---|---|---|
| JP | 2012-093693 | A | 5/2012 |
| WO | 2014/162792 | A1 | 10/2014 |

* cited by examiner

FURTHER REDUCTION OF POWER CONSUMPTION IN DISPLAY DEVICE WITH LOW-FREQUENCY DRIVING

TECHNICAL FIELD

The disclosure relates to a display device, and particularly to a display device provided with a pixel circuit including a light-emitting element.

BACKGROUND ART

In recent years, an organic electroluminescent (hereinafter referred to as EL) display device provided with a pixel circuit including an organic EL element has been put to practical use. The pixel circuit of the organic EL display device includes, in addition to the organic EL element, a drive transistor, a write control transistor, and the like. For each of these transistors, a thin-film transistor (hereinafter referred to as TFT) is used. The organic EL element is a light-emitting element that emits light with luminance corresponding to the amount of a flowing current. The drive transistor is provided in series with the organic EL element and controls the amount of current flowing through the organic EL element.

In addition, a technique for forming a transistor using an oxide semiconductor such as indium gallium zinc oxide (hereinafter referred to as IGZO) has been put into practical use. A transistor formed using an oxide semiconductor has a characteristic that a leakage current in an off state is extremely small. Therefore, a transistor connected to the gate terminal of the drive transistor is formed using an oxide semiconductor, whereby charge leakage from the gate terminal of the drive transistor can be prevented, and the shift of the gate potential of the drive transistor can be prevented. In addition, as a method for reducing the power consumption of the organic EL display device, low-frequency driving is known in which a frame period is classified into a scanning period and a pause period, and driving of a scanning line is stopped during the pause period. The low-frequency driving is also called pause driving.

A display device that performs low-frequency driving is described in, for example, each of WO 2014/162792, JP 2001-184015 A, and JP 2012-93693 A. WO 2014/162792 describes that in a display device that performs time-division driving, only one of three emission lines is selected in a pause driving mode to display a still image having one-third the resolution at the normal time. JP 2001-184015 A describes that a scanning period and a pause period are provided in a display device of an area gradation system, scanning is stopped during the pause period, and a power supply voltage of a drive circuit is set to zero. JP 2012-93693 A describes a display device including: a scanning driving unit that drives scanning lines at a first driving frequency in order to select pixels in units of horizontal lines; and an emission driving unit that drives light-emission control lines at a second driving frequency different from the first driving frequency in order to control the light emission of the pixels.

SUMMARY

Technical Problems

In the known display devices that perform low-frequency driving, power consumption is reduced by stopping driving of scanning lines. It is preferable to further reduce power consumption of a display device that performs low-frequency driving.

Therefore, a problem to be solved is to further reduce power consumption of a display device that performs low-frequency driving.

Solution to Problem

The above problem can be solved, for example, by a display device including a plurality of scanning lines, a plurality of data lines, a plurality of light-emission control lines, a plurality of pixel circuits each including a light-emitting element, a scanning line drive circuit configured to drive the scanning lines based on a first clock signal, a data line drive circuit configured to drive the data lines, a light-emission control line drive circuit configured to drive the light-emission control lines based on a second clock signal, and a display control circuit configured to output at least the first clock signal and the second clock signal. The display control circuit classifies a frame period into a scanning period and a pause period. During the pause period, the display control circuit stops the first clock signal and makes a frequency of the second clock signal lower than during the scanning period.

The above problem can also be solved by a method for driving a display device provided with a plurality of scanning lines, a plurality of data lines, a plurality of light-emission control lines, and a plurality of pixel circuits each including a light-emitting element. The method includes a step of driving the scanning lines based on a first clock signal, a step of driving the data lines, a step of driving the light-emission control lines based on a second clock signal, and a display control step of outputting at least the first clock signal and the second clock signal. The display control step includes classifying a frame period into a scanning period and a pause period, stopping the first clock signal during the pause period, and making a frequency of the second clock signal lower during the pause period than during the scanning period.

Effects of the Disclosure

According to the display device and the method for driving the display device, during the pause period, the frequency of the second clock signal is made lower than that during the scanning period, whereby the number of times the second clock signal and the potentials of the light-emission control lines change during the pause period can be reduced, and the power consumption of the display device during the pause period can be reduced. Therefore, the power consumption of the display device that performs low-frequency driving can be further reduced.

DESCRIPTION OF EMBODIMENTS

First Embodiment

Figure 1:
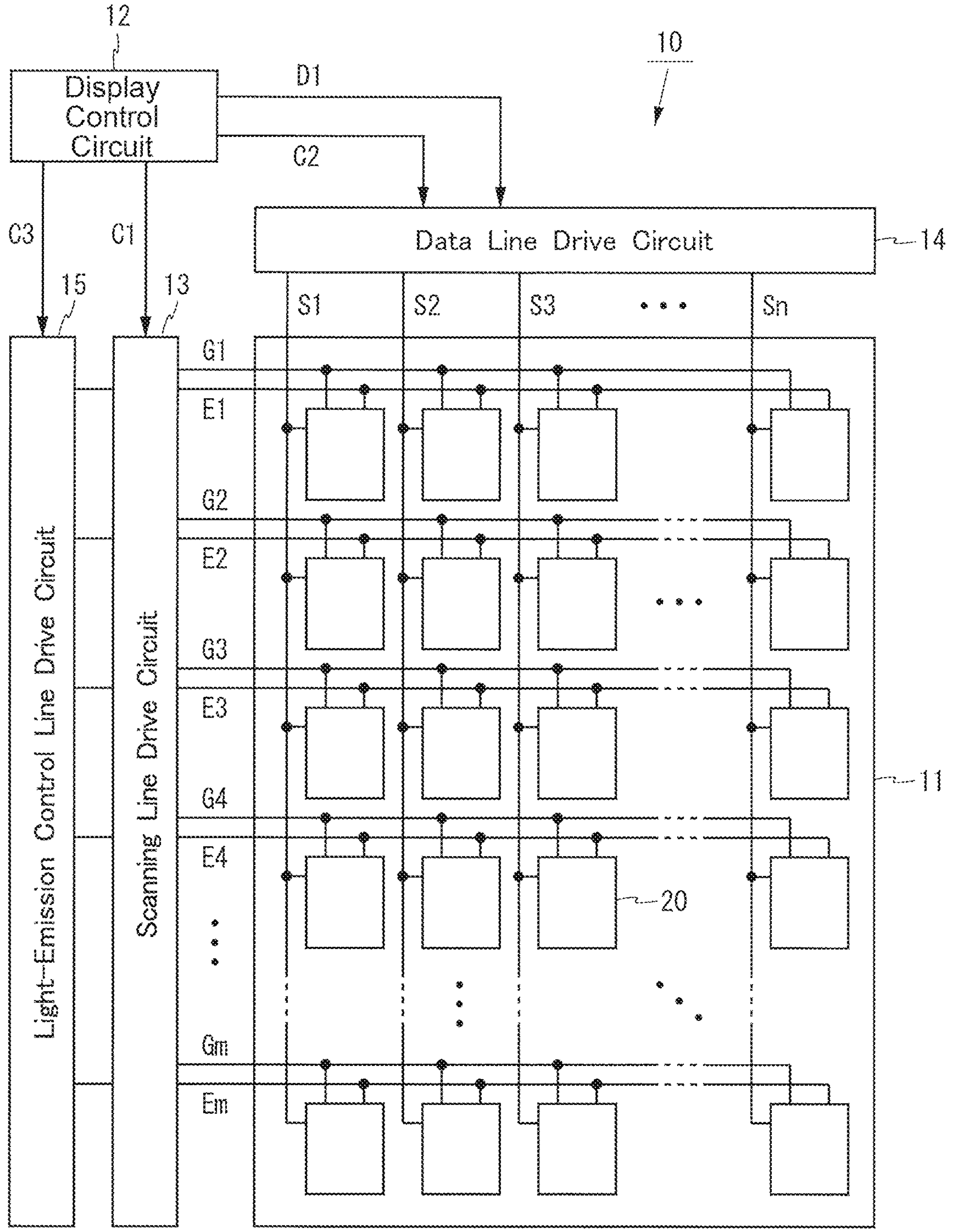
FIG. 1 is a block diagram illustrating a configuration of a display device according to a first embodiment.

FIG. 1 is a block diagram illustrating a configuration of a display device according to a first embodiment. A display device 10 illustrated in FIG. 1 is an organic EL display device including a display portion 11, a display control circuit 12, a scanning line drive circuit 13, a data line drive circuit 14, and a light-emission control line drive circuit 15. Hereinafter, m and n are integers of 2 or more, i is an integer between 1 and m inclusive, and j is an integer between 1 and n inclusive. The horizontal direction of the drawing is referred to as a row direction, and the vertical direction of the drawing is referred to as a column direction.

The display portion 11 includes m scanning lines G1 to Gm, n data lines S1 to Sn, m light-emission control lines E1 to Em, and (m×n) pixel circuits 20. The scanning lines G1 to Gm and the light-emission control lines E1 to Em extend in the row direction and are arranged in parallel to each other. The data lines S1 to Sn extend in the column direction and are arranged in parallel to each other so as to be orthogonal to the scanning lines G1 to Gm. The scanning lines G1 to Gm and the data lines S1 to Sn intersect at (m×n) locations. The (m×n) pixel circuits 20 are arranged corresponding to intersections of the scanning lines G1 to Gm and the data lines S1 to Sn. A high-level potential ELVDD and a low-level potential ELVSS are supplied to the pixel circuit 20, using a conductive member (not illustrated).

The display control circuit 12 outputs a control signal C1 to the scanning line drive circuit 13, outputs a control signal C2 and a video signal D1 to the data line drive circuit 14, and outputs a control signal C3 to the light-emission control line drive circuit 15. The scanning line drive circuit 13 drives the scanning lines G1 to Gm based on the control signal C1. The data line drive circuit 14 drives the data lines S1 to Sn based on the control signal C2 and the video signal D1. The light-emission control line drive circuit 15 drives the light-emission control lines E1 to Em based on the control signal C3.

The control signal C1 includes two-phase gate clocks GCK1, GCK2 and a gate start pulse GSP. The scanning line drive circuit 13 drives the scanning lines G1 to Gm based on the gate clocks GCK1, GCK2. The control signal C3 includes two-phase emission clocks ECK1, ECK2 and an emission start pulse ESP. The light-emission control line drive circuit 15 drives the light-emission control lines E1 to Em based on the emission clocks ECK1, ECK2.

Figure 2:
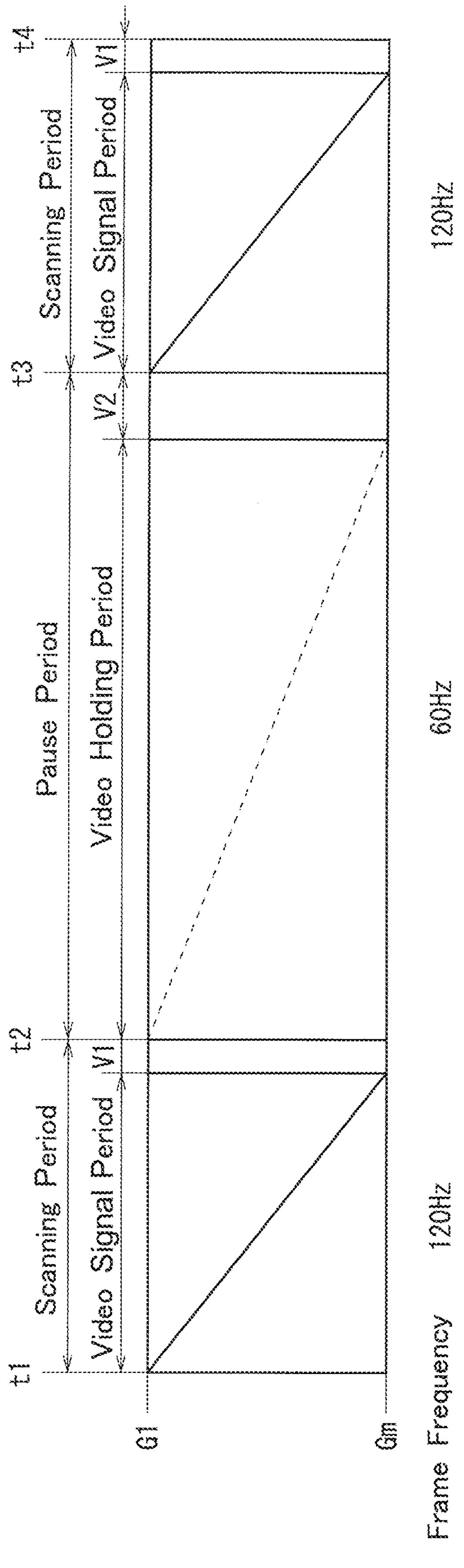
FIG. 2 is a diagram illustrating an example of a scanning period and a pause period of the display device illustrated in FIG. 1.

The display device 10 performs low-frequency driving in accordance with a control signal (not illustrated) provided from the outside. The display control circuit 12 classifies a frame period into a scanning period and a pause period. FIG. 2 is a diagram illustrating an example of a scanning period and a pause period in the display device 10. In FIG. 2, a period from time t1 to time t2 and a period from time t3 to time t4 are scanning periods, and a period from time t2 to time t3 is a pause period. The frame frequency of the scanning period is 120 Hz, and the frame frequency of the pause period is 60 Hz. The scanning period includes a video signal period and a vertical blanking period V1. The pause period includes a video holding period and a vertical blanking period V2. The length of the vertical blanking period V2 is twice the length of the vertical blanking period V1. During the video signal period, the scanning lines G1 to Gn are selected in ascending order (see oblique solid lines). During the video holding period, the scanning lines G1 to Gn are not selected (see an oblique broken line).

The length of one horizontal period during the scanning period is defined as Tx. During the scanning period, the display control circuit 12 outputs the gate clocks GCK1, GCK2 each having a cycle of 2Tx, and the gate start pulse GSP that is at a high level just for the time Tx near the head of the frame period. Based on these control signals, the scanning line drive circuit 13 sequentially controls the potentials of the scanning lines G1 to Gm to the high level for the time Tx each. Based on the control signal C2 and the video signal D1, the data line drive circuit 14 sequentially applies a potential corresponding to the video signal D1 to each of the data lines S1 to Sn for the time Tx. When the potential of the scanning line Gi is at the high level, the n pixel circuits 20 arranged in the ith row are selected, and the n potentials applied to the data lines S1 to Sn are respectively written to the selected n pixel circuits 20.

During the scanning period, the display control circuit 12 outputs emission clocks ECK1, ECK2 each having a cycle of 2Tx, and an emission start pulse ESP that is at the high level just for a predetermined time (here, 4Tx) near the head of the frame period. Based on these control signals, the light-emission control line drive circuit 15 sequentially controls the potentials of the light-emission control lines E1 to Em at the high level for a predetermined time (here, 5Tx) each while sequentially delaying the potentials by the time Tx. The organic EL elements in the pixel circuits 20 in the ith row each emit light with luminance corresponding to the potential written in the relevant pixel circuit 20 while the potential of the light-emission control line Ei is at the high level.

Figure 3:
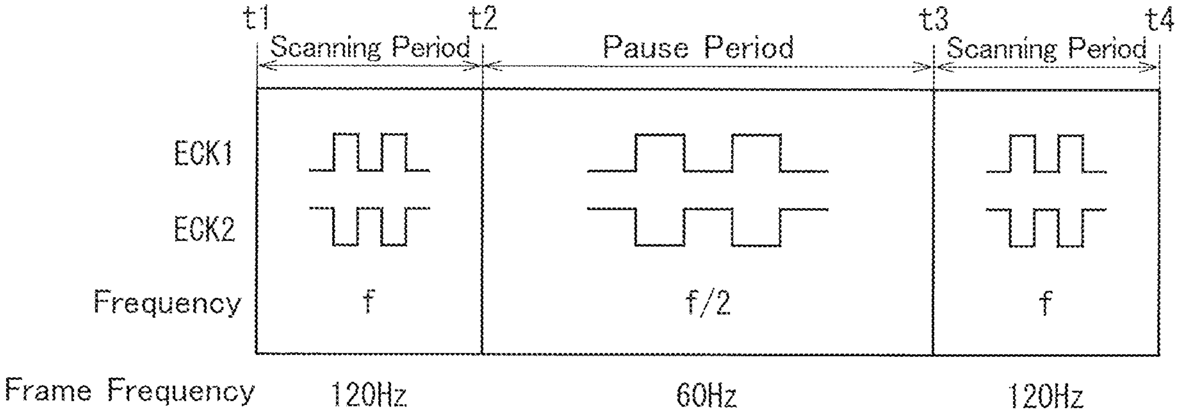
FIG. 3 is a schematic diagram illustrating an emission clock of the display device illustrated in FIG. 1.

FIG. 3 is a schematic diagram illustrating emission clocks ECK1, ECK2 in the scanning period and the pause period illustrated in FIG. 2. During the pause period, the display control circuit 12 stops the gate clocks GCK1, GCK2 and makes the frequencies of the emission clocks ECK1, ECK2 lower than those during the scanning period. Specifically, during the pause period illustrated in FIG. 2, the display control circuit 12 outputs emission clocks ECK1, ECK2 each having a cycle of 4Tx, and an emission start pulse ESP that is at the high level just for a predetermined time (here, 8Tx) near the beginning of the frame period. When the frequencies of the emission clocks ECK1, ECK2 during the pause period are f, the frequencies of the emission clocks ECK1, ECK2 during the scanning period are f/2.

Figure 4:
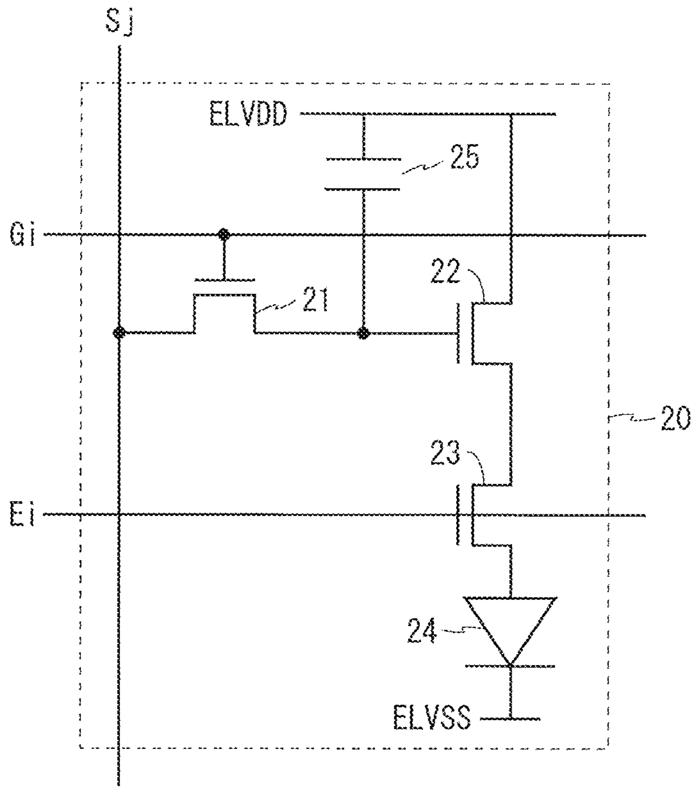
FIG. 4 is a circuit diagram of a pixel circuit of the display device illustrated in FIG. 1.

FIG. 4 is a circuit diagram of the pixel circuit 20. FIG. 4 illustrates a pixel circuit 20 in the ith row and the jth column. The pixel circuit 20 illustrated in FIG. 4 includes three TFTs 21 to 23, an organic EL element 24, and a capacitor 25 and is connected to a scanning line Gi, a data line Sj, and a light-emission control line Ei. The TFTs 21 to 23 are N-channel transistors. The TFTs 21 to 23 are formed using, for example, an oxide semiconductor such as IGZO. The organic EL element 24 functions as a light-emitting element.

As illustrated in FIG. 4, the high-level potential ELVDD is applied to the drain terminal of the TFT 22. The source terminal of the TFT 22 is connected to the drain terminal of the TFT 23. The source terminal of the TFT 23 is connected to the anode terminal of the organic EL element 24. The low-level potential ELVSS is applied to the cathode terminal of the organic EL element 24. One conductive terminal (left terminal in FIG. 4) of the TFT 21 is connected to the data line Sj. The other conductive terminal of the TFT 21 is connected to the gate terminal of the TFT 22. The gate terminal of the TFT 21 is connected to the scanning line Gi. The gate terminal of the TFT 23 is connected to the light-emission control line Ei. The capacitor 25 is provided between the conductive member having the high-level potential ELVDD and the gate terminal of the TFT 22.

In the pixel circuit 20, while the potential of the scanning line Gi is at the high level, the TFT 21 is in an off state, and the potential of the data line Sj is applied to the gate terminal of the TFT 22. When the potential of the scanning line Gi changes to a low level, the TFT 21 is turned off. Thereafter, the gate potential of the TFT 22 is held by the action of the capacitor 25. While the potential of the light-emission control line Ei is at the high level, the TFT 23 is turned on, and a current passing through the TFTs 22, 23 and the organic EL element 24 flows between the conductive member having the high-level potential ELVDD and the conductive member having the low-level potential ELVSS. At this time, the organic EL element 24 emits light with luminance corresponding to the gate-source voltage of the TFT 22. As described above, the organic EL element 24 emits light with luminance corresponding to the potential applied to the data line Sj.

Figure 5:
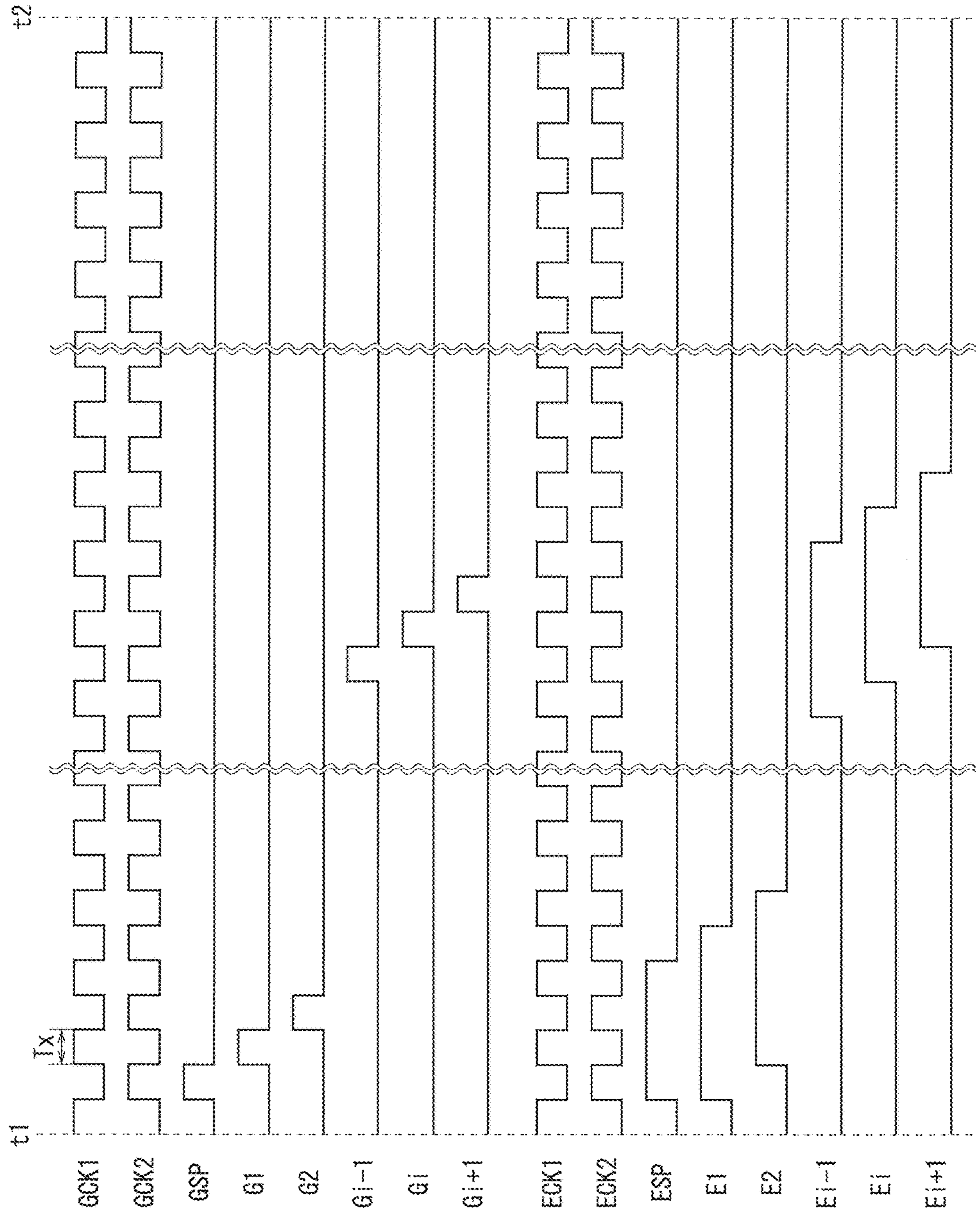
FIG. 5 is a timing chart for a scanning period of the display device illustrated in FIG. 1.

FIG. 5 is a timing chart for the scanning period of display device 10. FIG. 5 illustrates changes in various signals in the scanning period from time t1 to time t2 illustrated in FIG. 2. Hereinafter, the signals on the scanning lines G1 to Gm are referred to as scanning signals G1 to Gm, respectively, and the signals on the light-emission control lines E1 to Em are referred to as light-emission control signals E1 to Em, respectively. In addition, when a is an integer of 1 or more, a period from a time point at which time (a−1)Tx elapses from the head of the frame period to a time point at which time aTx elapses is referred to as an ath period.

During the scanning period, the gate clock GCK1 is alternately at the high level and the low level for the time Tx each. The gate clock GCK2 is the inverted signal of the gate clock GCK1. The gate start pulse GSP are at the high level during the second period and are at the low level during the other periods. The scanning signal G1 is delayed by the time Tx from the gate start pulse GSP, is at the high level during the third period, and is at the low level during the other periods. The scanning signal Gi (where i is 2 or more) is delayed by the time Tx from the scanning signal Gi−1, is at the high level during the (i+2)th period and is at the low level during the other periods.

The emission clocks ECK1, ECK2 are alternately at the high level and the low level for the time Tx each. The emission clock ECK2 is the inverted signal of the emission clock ECK1. The emission start pulse ESP is at the high level during the second to fifth periods and is at the low level during the other periods. The light-emission control signal E1 is at the high level during the second to sixth periods and is at the low level during the other periods. The light-emission control signal Ei (where i is 2 or more) is delayed from the light-emission control signal Ei−1 by the time Tx, is at the high level during the (i+1)th to (i+5)th periods, and is at the low level during the other periods.

Figure 6:
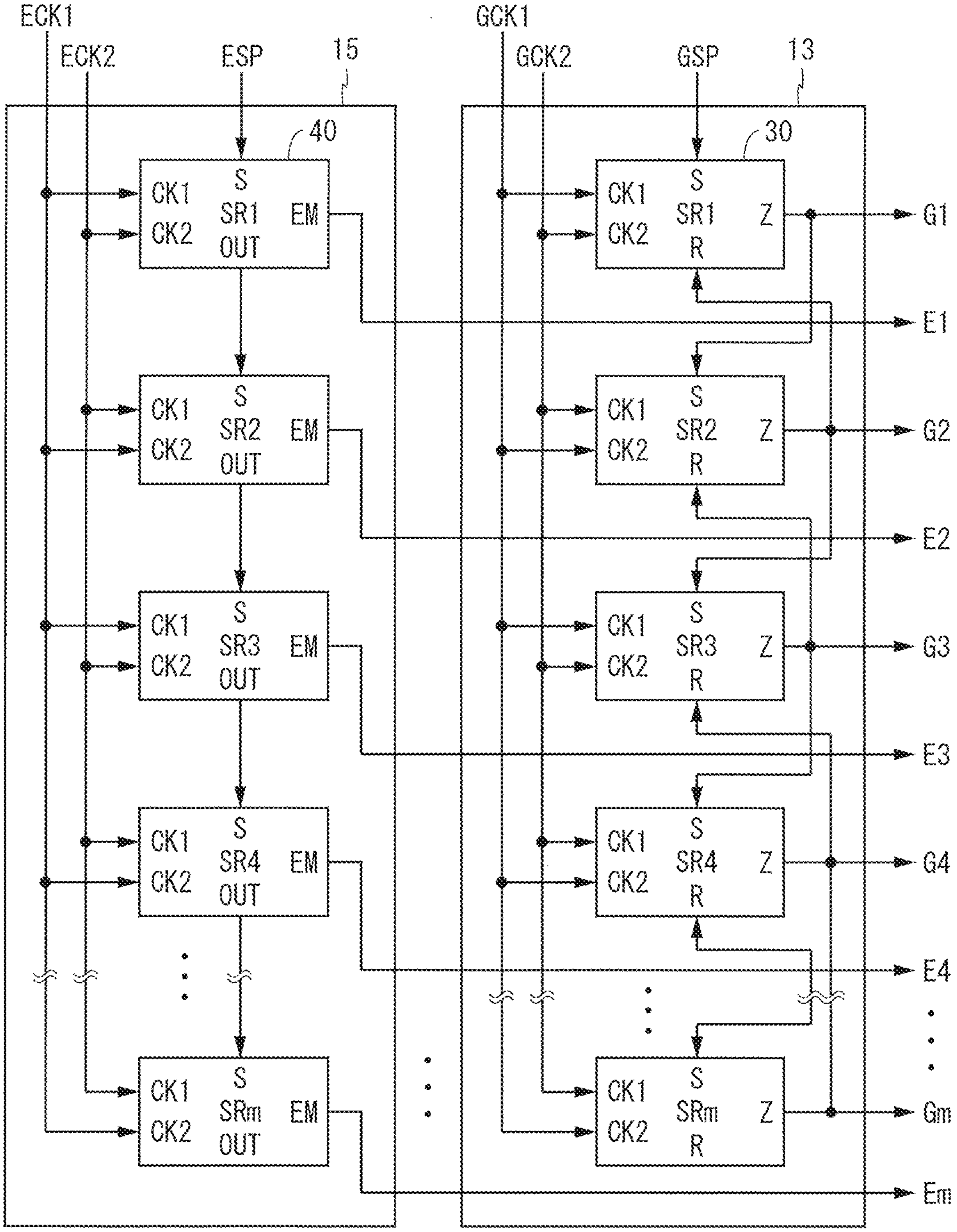
FIG. 6 is a block diagram illustrating details of a scanning line drive circuit and a light-emission control line drive circuit of the display device illustrated in FIG. 1.

FIG. 6 is a block diagram illustrating details of the scanning line drive circuit 13 and the light-emission control line drive circuit 15. The scanning line drive circuit 13 has a configuration in which m unit circuits 30 are connected in multiple stages. The unit circuits 30 each include two clock terminals CK1, CK2, a set terminal S, a reset terminal R, and an output terminal Z. Of the control signal C1 supplied from the display control circuit 12, the gate clock GCK1 is supplied to the clock terminals CK1 of the unit circuits 30 of odd-numbered stages and the clock terminals CK2 of the unit circuits 30 of even-numbered stages. The gate clock GCK2 is supplied to the clock terminals CK2 of the unit circuits 30 of the odd-numbered stages and the clock terminals CK1 of the unit circuits 30 of the even-numbered stages. The gate start pulse GSP is supplied to the set terminal S of the unit circuit 30 of the first stage. The output terminal Z of the unit circuit 30 of an ith stage is connected to the scanning line Gi, the set terminal S of the unit circuit 30 of an (i+1)th stage, and the reset terminal R of the unit circuit 30 of an (i−1)th stage. The unit circuit 30 of each stage is supplied with a low-level potential VSS by means not illustrated.

The light-emission control line drive circuit 15 has a configuration in which m unit circuits 40 are connected in multiple stages. The unit circuits 40 each include two clock terminals CK1, CK2, a set terminal S, and two output terminals EM, OUT. Of the control signal C3 supplied from the display control circuit 12, the emission clock ECK1 is supplied to the clock terminals CK1 of the unit circuits 40 of odd-numbered stages and the clock terminals CK2 of the unit circuits 40 of even-numbered stages. The emission clock ECK2 is supplied to the clock terminals CK2 of the unit circuits 40 of the odd-numbered stages and the clock terminals CK1 of the unit circuits 40 of the even-numbered stages. The emission start pulse ESP is supplied to the set terminal S of the unit circuit 40 of the first stage. The output terminal EM of the unit circuit 40 of an ith stage is connected to the light-emission control line Ei. The output terminal OUT of the unit circuit 40 of the ith stage is connected to the set terminal S of the unit circuit 40 of an (i+1)th stage. The unit circuit 40 of each stage is supplied with a high-level potential VDD and the low-level potential VSS by means not illustrated.

Figure 7:
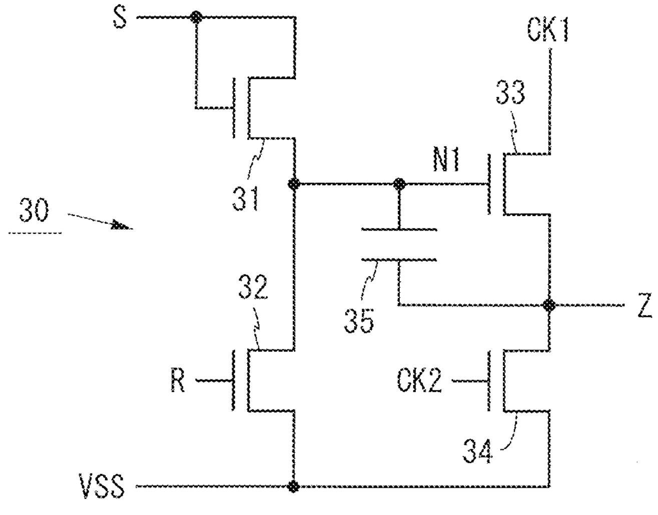
FIG. 7 is a circuit diagram of a unit circuit of the scanning line drive circuit illustrated in FIG. 6.

FIG. 7 is a circuit diagram of the unit circuit 30. As illustrated in FIG. 7, the unit circuit 30 includes four TFTs 31 to 34 and a capacitor 35. The TFTs 31 to 34 are N-channel transistors. Hereinafter, a node to which the gate terminal of the TFT 33 is connected is referred to as N1. The drain terminal and the gate terminal of the TFT 31 are connected to the set terminal S. The source terminal of the TFT 31 is connected to the drain terminal of the TFT 32 and the gate terminal of the TFT 33. The drain terminal of the TFT 33 is connected to the clock terminal CK1. The source terminal of the TFT 33 is connected to the drain terminal of the TFT 34 and the output terminal Z. The gate terminal of the TFT 32 is connected to the reset terminal R. The gate terminal of the TFT 34 is connected to the clock terminal CK2. A low-level potential VSS is applied to the source terminals of the TFTs 32 and 34. The capacitor 35 is provided between the gate terminal and the source terminal of the TFT 33.

Figure 8:
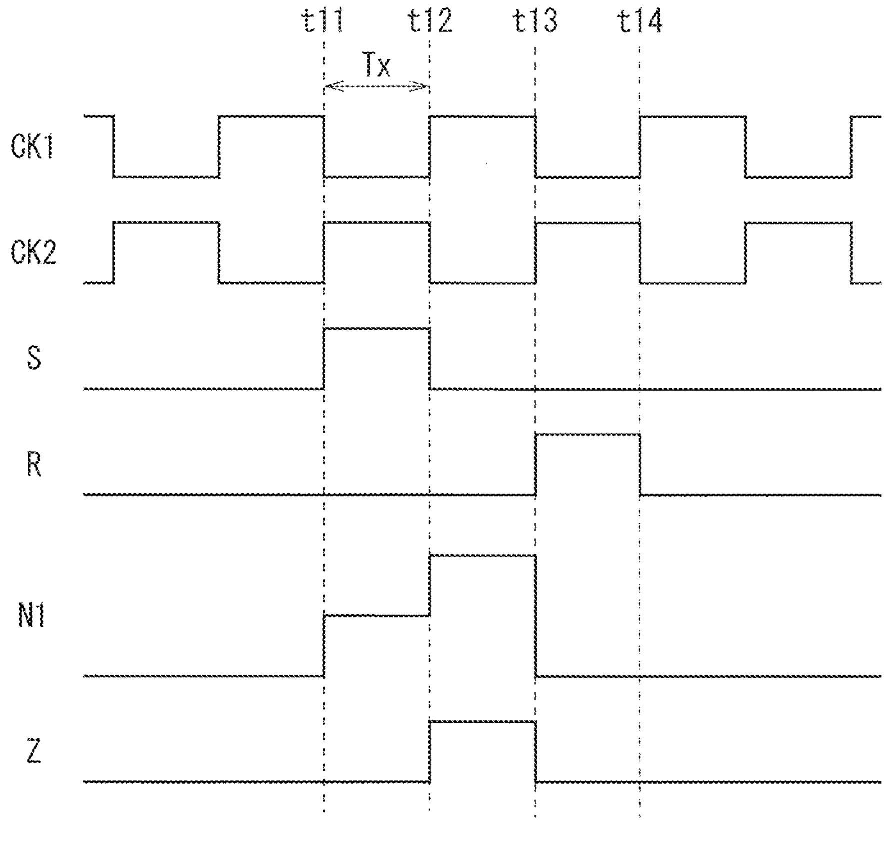
FIG. 8 is a timing chart of the unit circuit illustrated in FIG. 7 in the scanning period.

FIG. 8 is a timing chart of the scanning period of the unit circuit 30. Hereinafter, a signal input or output via a certain terminal is referred to by the same name as that of the terminal. For example, a signal input via the clock terminal CK1 is referred to as a clock signal CK1. Immediately before time t11, the clock signal CK1 is at the high level, and the clock signal CK2, the set signal S, and the reset signal R are at the low level. At this time, the TFTs 31, 32, 34 are in an off state. The potential of the node N1 and an output signal Z are at the low level, and the TFT 33 is in the off state.

At time t11, the clock signal CK1 changes to the low level, and the clock signal CK2 and the set signal S change to the high level. Accordingly, the TFTs 31 and 34 are turned on. When the TFT 31 is turned on, the potential of the node N1 changes to the high level, and the TFT 33 is turned on.

At time t12, the clock signal CK1 changes to the high level, and the clock signal CK2 and the set signal S change to the low level. Accordingly, the TFTs 31, 34 are turned off. The capacitor 35 is provided between the gate terminal and the source terminal of the TFT 33. Thus, when the clock signal CK1 changes to the high level and the output signal Z changes to the high level, the potential of the node N1 is pushed up via the capacitor 35 and goes to the high level higher than usual. Hence the output signal Z goes to the high level at the same level as the clock signal CK1 without decreasing by the threshold voltage of the TFT 33.

At time t13, the clock signal CK1 changes to the low level, and the clock signal CK2 and the reset signal R change to the high level. Accordingly, the TFTs 32, 34 are turned on. When the TFT 32 is turned on, the potential of the node N1 changes to the low level, and the TFT 33 is turned off. When the TFT 34 is turned on, the output signal Z changes to the low level.

At time t14, the clock signal CK1 changes to the high level, and the clock signal CK2 and the reset signal R change to the low level. Accordingly, the TFTs 32, 34 are turned off. As described above, the potential of the node N1 is at the high level during a period from time t11 to time t13 (the high level higher than usual during a period from time t12 to time t13) and is at the low level during the other periods. The output signal Z is at the high level during the period from time t12 to time t13 and is at the low level during the other periods.

The output signal Z of the unit circuit 30 of the ith stage is delayed by the time Tx from the set signal S and is at the high level just for the time Tx. The set signal S is the output signal Z of the unit circuit 30 of the (i−1)th stage. The output signal Z of the unit circuit of the ith stage is applied to the scanning line Gi. Therefore, the potentials of the scanning lines G1 to Gm sequentially go to the high level in ascending order for the time Tx each (see FIG. 5).

Figure 9:
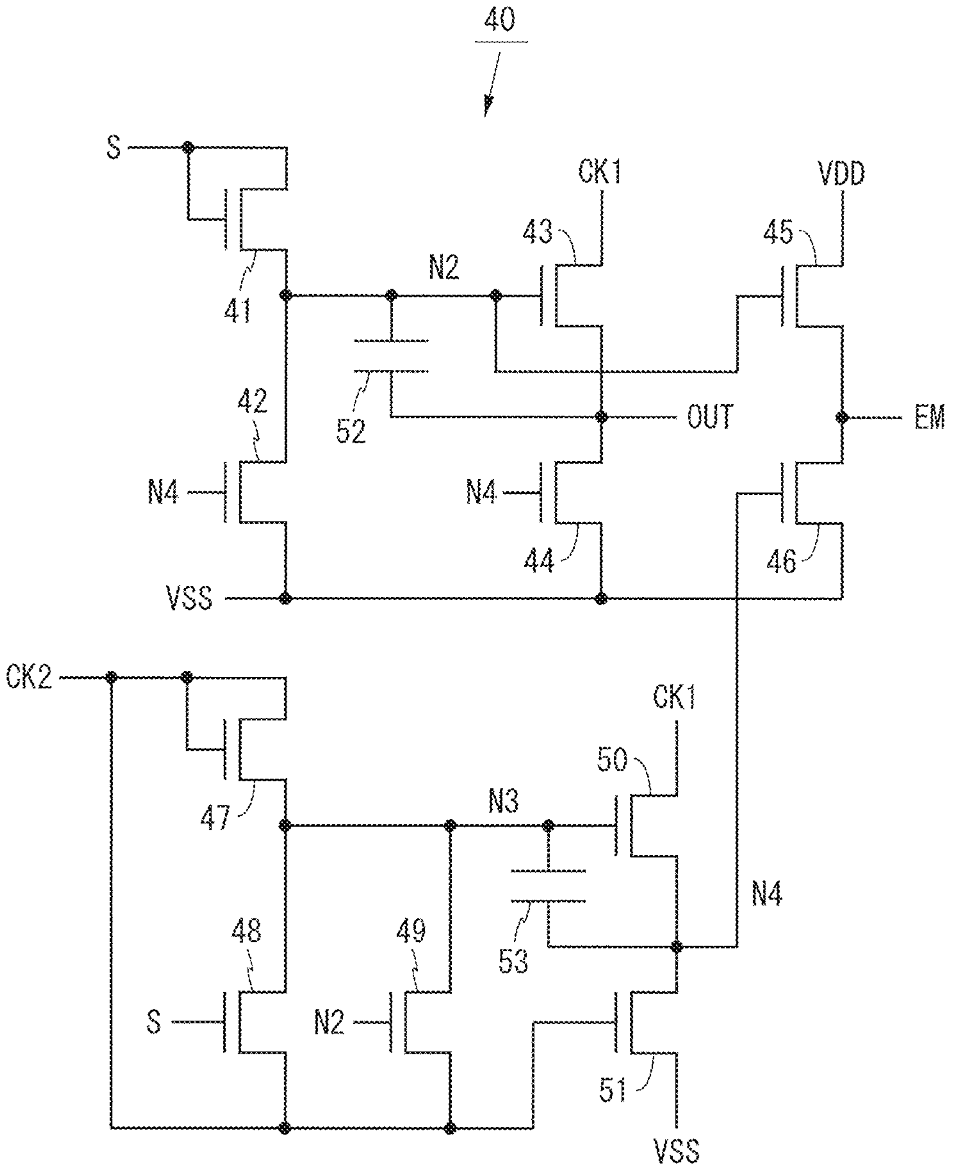
FIG. 9 is a circuit diagram of a unit circuit of the light-emission control line drive circuit illustrated in FIG. 6.

FIG. 9 is a circuit diagram of the unit circuit 40. As illustrated in FIG. 9, the unit circuit 40 includes 11 TFTs 41 to 51 and 2 capacitors 52, 53. The TFTs 41 to 51 are N-channel transistors. In FIG. 9, a node to which the gate terminal of the TFT 43 is connected is referred to as N2, a node to which the gate terminal of the TFT 50 is connected is referred to as N3, and a node to which the source terminal of the TFT 50 is connected is referred to as N4.

The drain terminal and the gate terminal of the TFT 41 are connected to the set terminal S. The source terminal of the TFT 41 is connected to the drain terminal of the TFT 42 and the gate terminals of the TFTs 43 and 45. The drain terminal of the TFT 43 is connected to the clock terminal CK1. The source terminal of the TFT 43 is connected to the drain terminal of the TFT 44 and the output terminal OUT. A high-level potential VDD is applied to the drain terminal of the TFT 45. The source terminal of the TFT 45 is connected to the drain terminal of the TFT 46 and the output terminal EM.

The drain terminal and the gate terminal of the TFT 47 are connected to the clock terminal CK2. The source terminal of the TFT 47 is connected to the drain terminals of the TFTs 48, 49 and the gate terminal of the TFT 50. The drain terminal of the TFT 50 is connected to the clock terminal CK1. The source terminal of the TFT 50 is connected to the gate terminal of the TFT 46 and the drain terminal of the TFT 51.

The gate terminals of the TFTs 42, 44 are connected to the node N4. The gate terminal of the TFT 48 is connected to the set terminal S. The gate terminal of the TFT 49 is connected to the node N2. The source terminals of the TFTs 48, 49 and the gate terminal of the TFT 51 are connected to the clock terminal CK2. A low-level potential VSS is applied to the source terminals of the TFTs 42, 44, 46, 51. The capacitor 52 is provided between the gate terminal and the source terminal of the TFT 43. The capacitor 53 is provided between the gate terminal and the source terminal of the TFT 50.

Figure 10:
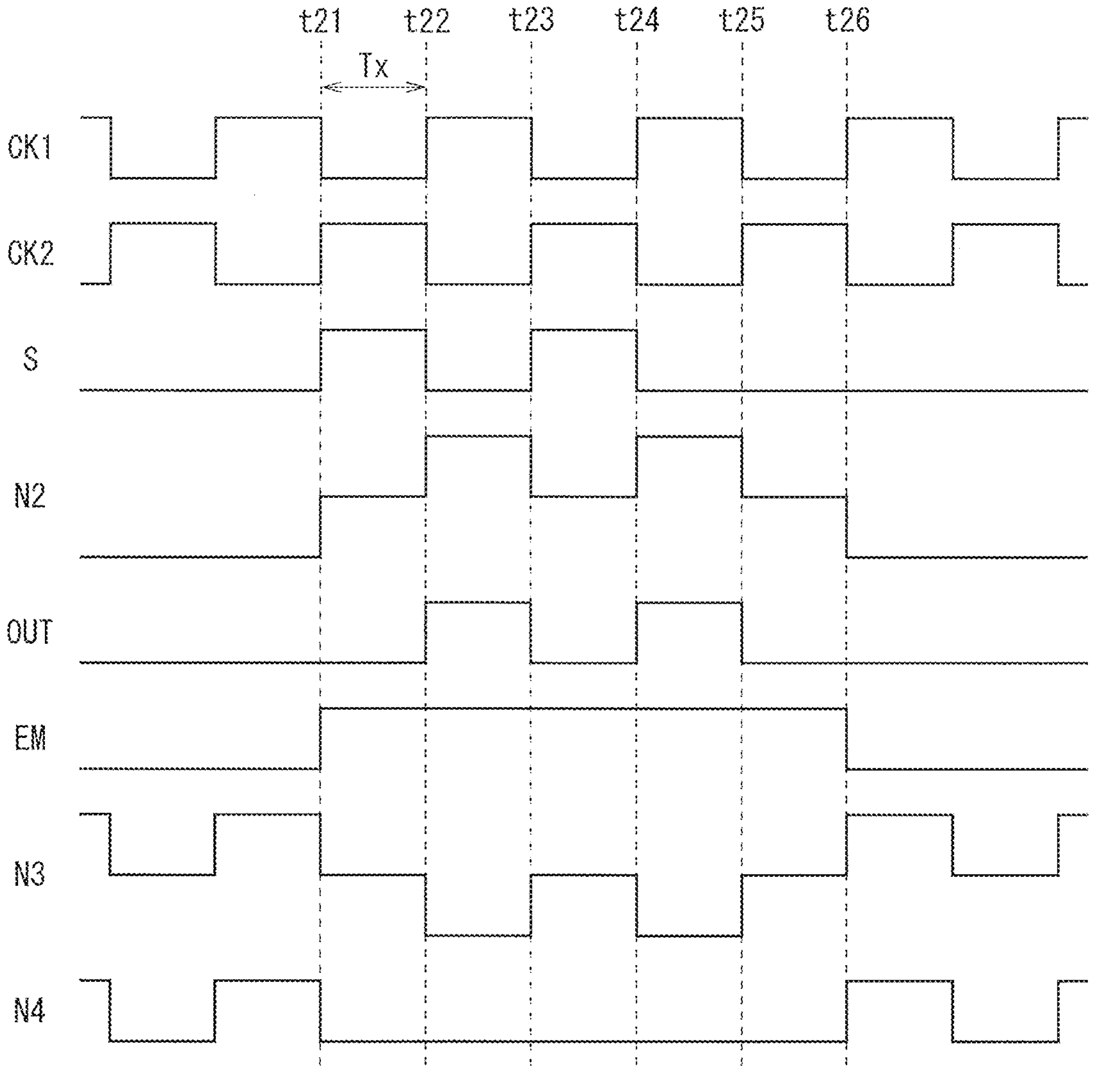
FIG. 10 is a timing chart of the unit circuit illustrated in FIG. 9 in a scanning period.

FIG. 10 is a timing chart of the scanning period of the unit circuit 40. Immediately before time t21, the clock signal CK1 is at the high level, and the clock signal CK2 and the set signal S are at the low level. At this time, the TFTs 41, 47, 48, 51 are in the off state. The potential of the node N3 is at the high level higher than usual, the potential of the node N4 is at the high level, the potential of the node N2 and the output signals EM, OUT are at the low level, the TFTs 42, 44, 46, 50 are in the on state, and the TFTs 43, 45, 49 are in the off state.

At time t21, the clock signal CK1 changes to the low level, and the clock signal CK2 and the set signal S change to the high level. Accordingly, the TFTs 41, 47, 48, 51 are turned on. When the TFT 41 is turned on, the potential of the node N2 changes to the high level, and the TFTs 43, 45, 49 are turned on. When the clock signal CK1 changes to the low level and the TFTs 47 to 49 are turned on, the potential of the node N3 returns to the normal high level. At this time, the TFT 50 is kept in the on state. When the clock signal CK1 changes to the low level, the TFT 50 is kept in the on state. When the TFT 51 is turned on, the potential of the node N4 changes to the low level, and the TFTs 42, 44, 46 are turned off. When the TFT 45 is turned on and the TFT 46 is turned off, the output signal EM changes to the high level.

At time t22, the clock signal CK1 changes to the high level, and the clock signal CK2 and the set signal S change to the low level. Accordingly, the TFTs 41, 47, 48, 51 are turned off. The capacitor 52 is provided between the gate terminal and the source terminal of the TFT 43. Thus, when the clock signal CK1 changes to the high level and the output signal OUT changes to the high level, the potential of the node N2 is pushed up via the capacitor 52 and goes to the high level higher than usual. Therefore, the level of the output signal OUT goes to the same level as the high level of the clock signal CK1 without decreasing by the threshold voltage of the TFT 43. When the clock signal CK2 changes to the low level while the TFT 49 is in the on state, the potential of the node N3 changes to the low level, and the TFT 50 is turned off.

At time t23, the clock signal CK1 changes to the low level, and the clock signal CK2 and the set signal S change to the high level. Accordingly, the TFTs 41, 47, 48, 51 are turned on. When the clock signal CK1 changes to the low level, the output signal OUT changes to the low level, and the potential of the node N2 returns to the normal high level. When the TFT 47 is turned on, the potential of the node N3 changes to the high level, and the TFT 50 is turned on.

At time t24, the clock signal CK1 changes to the high level, and the clock signal CK2 and the set signal S change to the low level. Accordingly, the TFTs 41, 47, 48, 51 are turned off. When the clock signal CK1 changes to the high level, the output signal OUT changes to the high level, and the potential of the node N2 goes to the high level higher than usual. When the clock signal CK2 changes to the low level while the TFT 49 is in the on state, the potential of the node N3 changes to the low level, and the TFT 50 is turned off.

At time t25, the clock signal CK1 changes to the low level, and the clock signal CK2 changes to the high level. Accordingly, the TFTs 47 and 51 are turned on. When the clock signal CK1 changes to the low level, the output signal OUT changes to the low level, and the potential of the node N2 returns to the normal high level. When the TFT 47 is turned on, the potential of the node N3 changes to the high level, and the TFT 50 is turned on.

At time t26, the clock signal CK1 changes to the high level, and the clock signal CK2 changes to the low level. Accordingly, the TFTs 47, 51 are turned off. At this time, with the TFT 50 being in the on state, when the clock signal CK1 changes to the high level, the potential of the node N4 changes to the high level, and the TFTs 42, 44, 46 are turned on. When the TFT 42 is turned on, the potential of the node N2 changes to the low level, and the TFTs 43, 45, 49 are turned off. The clock signal CK2 changes to the low level, and the TFTs 47 to 49 are turned off, so that the potential of the node N3 goes to the high level higher than usual.

As described above, the potential of the node N2 is at the high level during a period from time t21 to time t26 (the high level higher than usual during a period from time t22 to time t23 and a period from time t24 to time t25) and is at the low level during the other periods. The output signal OUT is at the high level during the period from time t22 to time t23 and the period from time t24 to time t25 and is at the low level during the other periods. The output signal EM is at the high level during the period from time t21 to time t26 and is at the low level during the other periods. The potential of the node N3 is at the low level during the period from time t22 to time t23 and the period from time t24 to time t25 and is at the high level during the other periods (is particularly at the high level higher than usual during a period when the clock signal CK1 is at the high level). The potential of the node N4 is at the low level during the period from time t21 to time t26 and a period when the clock signal CK2 is at the high level, and is at the high level during the other periods. Also, when the set signal S is at the high level during a period from time t21 to time t24, the unit circuit 40 operates almost similarly to the same manner as described above.

In the unit circuit 40 of the ith stage, when the set signal S changes in the order of the high level, the low level, and the high level, the output signal OUT similarly changes with a time delay of Tx from the set signal S, and the output signal EM is at the high level just for the time 5Tx from when the set signal S changes to the high level. The set signal S is the output signal OUT of the unit circuit of the (i−1)th stage. The output signal EM of the unit circuit 40 of the ith stage is applied to the light-emission control line Ei. Therefore, the potentials of the light-emission control lines E1 to Em are sequentially delayed by the time Tx and go to the high level in ascending order for time 5Tx each (see FIG. 5).

Figure 11:
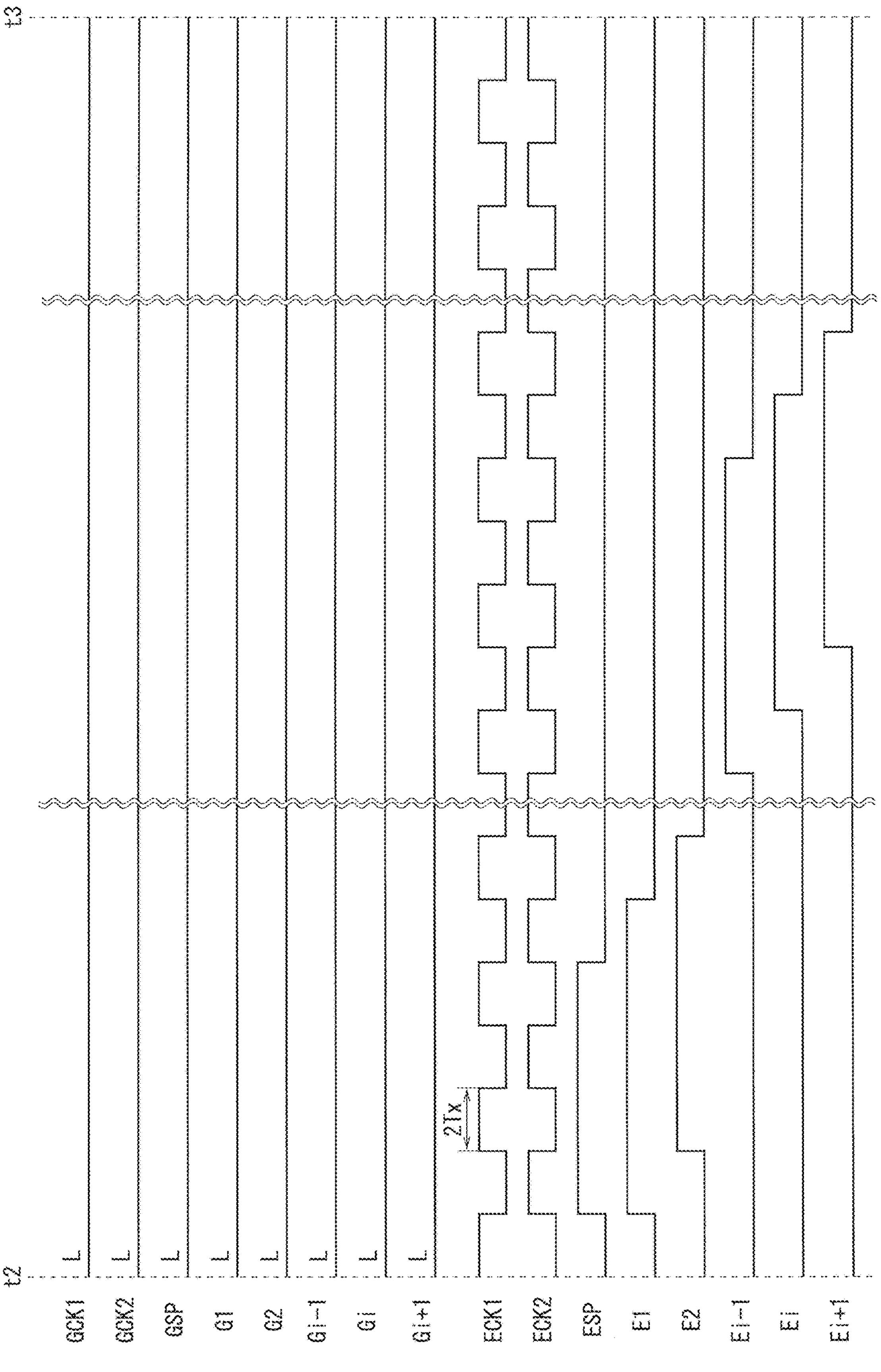
FIG. 11 is a timing chart for a pause period of the display device illustrated in FIG. 1.

FIG. 11 is a timing chart of the display device 10 in the pause period. FIG. 11 illustrates changes in various signals in the pause period illustrated in FIG. 2. During the pause period, the gate clocks GCK1, GCK2 and the gate start pulse GSP are fixed to the low level. Hence the scanning signals G1 to Gm are fixedly at the low level.

The emission clock ECK1 is alternately at the high level and the low level for time 2Tx each. The emission clock ECK2 is the inverted signal of the emission clock ECK1. The emission start pulse ESP is at the high level during the third to tenth periods and is at the low level during the other periods. The light-emission control signal E1 is at the high level during the third to twelfth periods and is at the low level during the other periods. The light-emission control signal Ei (where i is 2 or more) is delayed from the light-emission control signal Ei−1 by the time 2Tx, is at the high level during the (2i+1)th to (2i+10)th periods, and is at the low level during the other periods.

The operation of the unit circuit 40 during the pause period is the same as an operation obtained by doubling, in the operation of the unit circuit 40 during the scanning period, the lengths of the respective periods in which the clock signals CK1, CK2 and the set signal S are at the high level and the lengths of the respective periods in which these signals are at the low level.

During the scanning period, the display control circuit 12 outputs the gate clocks GCK1, GCK2 each having a cycle of 2Tx and the emission clocks ECK1, ECK2 each having a cycle of 2Tx. During the scanning period, the scanning line drive circuit 13 drives the scanning lines G1 to Gm based on the gate clocks GCK1, GCK2, and the light-emission control line drive circuit 15 drives the light-emission control lines E1 to Em based on the emission clocks ECK1, ECK2 each having a cycle of 2Tx. On the other hand, during the pause period, the display control circuit 12 fixes the gate clocks GCK1, GCK2 to the low level and outputs the emission clocks ECK1, ECK2 each having a cycle of 4Tx. During the pause period, the scanning line drive circuit 13 stops driving the scanning lines G1 to Gm, and the light-emission control line drive circuit 15 drives the light-emission control lines E1 to Em based on the emission clocks ECK1, ECK2 each having a cycle of 4Tx.

During the pause period, the display control circuit 12 stops the gate clocks GCK1, GCK2 and makes the frequencies of the emission clocks ECK1, ECK2 lower than those during the scanning period (to ½). By stopping the gate clocks GCK1, GCK2 during the pause period, the potentials of the scanning lines G1 to Gm are fixed to the low level, and the power consumption of the display device during the pause period can be reduced. In addition, during the pause period, the frequencies of the emission clocks ECK1, ECK2 is made lower than those during the scanning period, whereby the power consumption of the display device 10 during the pause period can be further reduced.

As described above, the display device 10 according to the present embodiment includes: the plurality of scanning lines G1 to Gm; the plurality of data lines S1 to Sn; the plurality of light-emission control lines E1 to Em; the plurality of pixel circuits 20 each including the light-emitting element (organic EL element 24); the scanning line drive circuit 13 configured to drive the scanning lines G1 to Gm based on the first clock signal (gate clocks GCK1, GCK2); the data line drive circuit 14 configured to drive the data lines S1 to Sn; the light-emission control line drive circuit 15 configured to drive the light-emission control lines E1 to Em based on the second clock signal (emission clocks ECK1, ECK2); and the display control circuit 12 configured to output at least the first clock signal and the second clock signal. The display control circuit 12 classifies a frame period into a scanning period and a pause period, and during the pause period, the display control circuit 12 stops the first clock signal and makes the frequency of the second clock signal lower than that during the scanning period.

According to the display device 10 of the present embodiment, during the pause period, the frequency of the second clock signal is made lower than that during the scanning period, whereby the number of times the second clock signal and the potentials of the light-emission control lines E1 to Em change during the pause period can be reduced, and the power consumption of the display device 10 during the pause period can be reduced. Therefore, the power consumption of the display device 10 that performs low-frequency driving can be further reduced.

Second Embodiment

A display device according to a second embodiment has the same configuration as the display device 10 according to the first embodiment (see FIGS. 1, 4, 6, 7 and 9). The display device according to the present embodiment has a full light-emission mode (hereinafter referred to as a first full light-emission mode) in which all the organic EL elements 24 are caused to emit light, in addition to a normal mode in which the display device operates similarly to the display device 10 according to the first embodiment. Hereinafter, the operation of the display device according to the present embodiment in the first full light-emission mode will be described.

Figure 12:
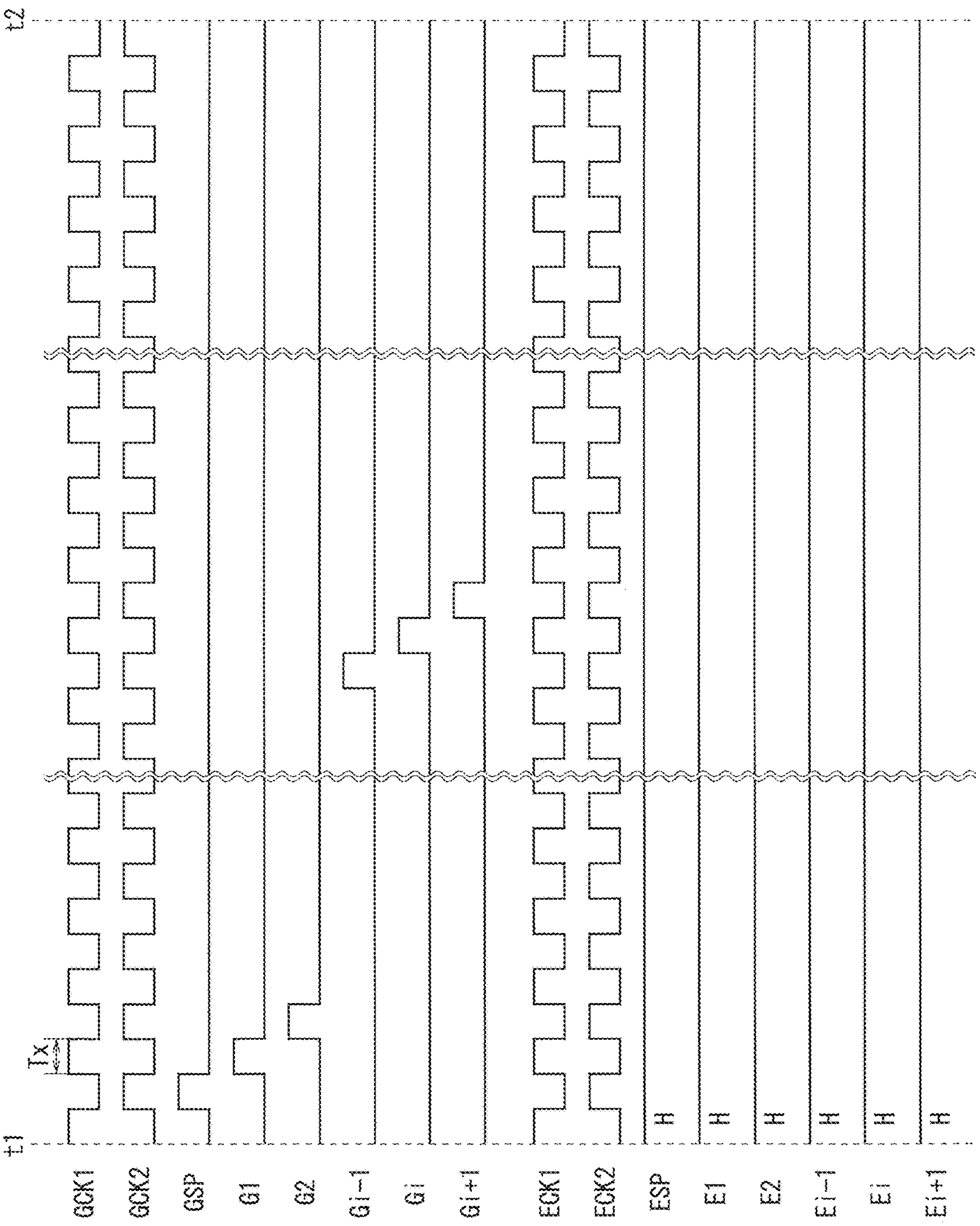
FIG. 12 is a timing chart for a scanning period of a display device according to a second embodiment.
Figure 13:
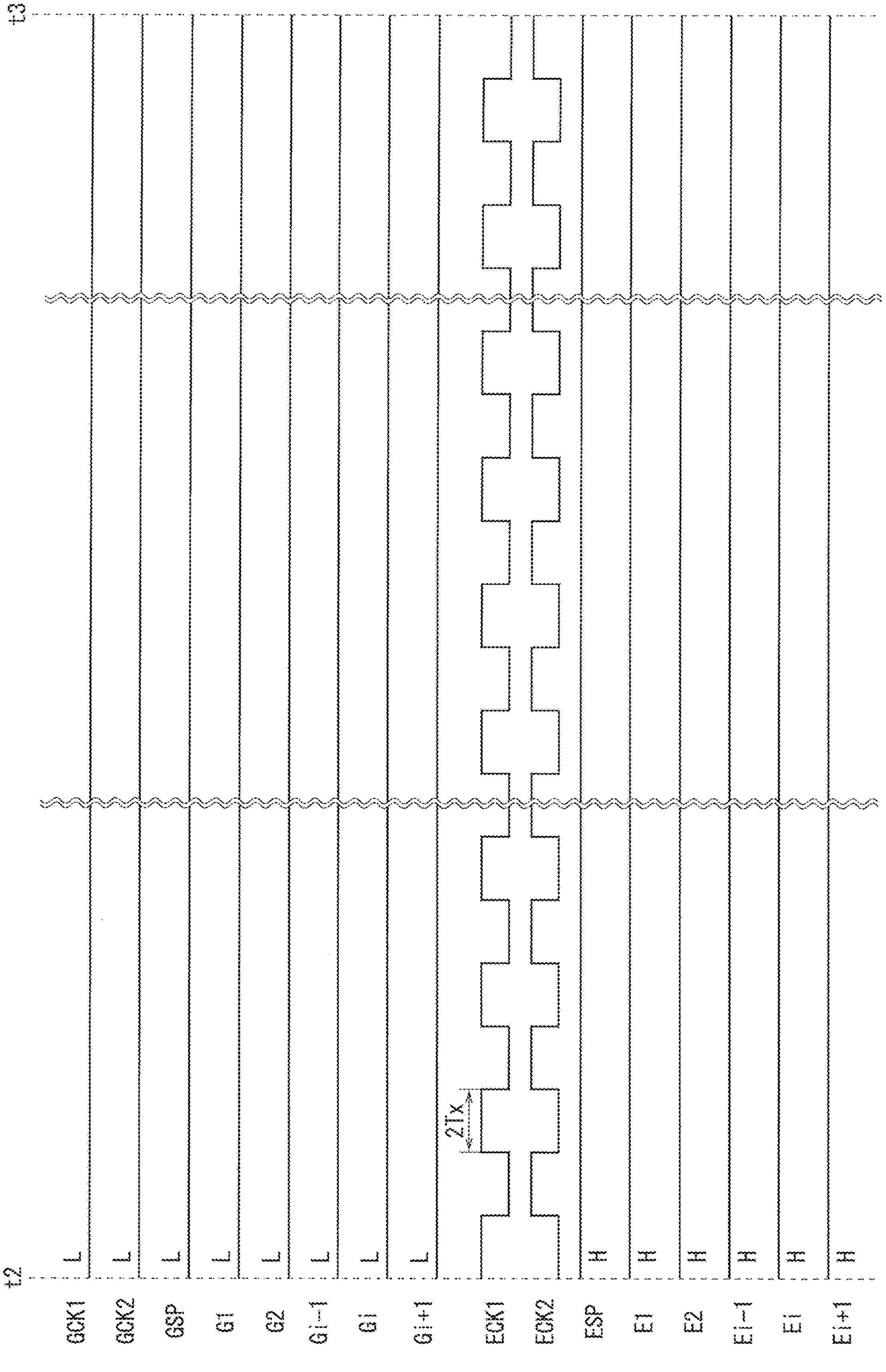
FIG. 13 is a timing chart for a pause period of the display device according to the second embodiment.

FIG. 12 is a timing chart for the scanning period in the first full light-emission mode of the display device according to the present embodiment. FIG. 12 illustrates changes in various signals in the scanning period from time t1 to time t2 illustrated in FIG. 2. FIG. 13 is a timing chart for a pause period in the first full light-emission mode of the display device according to the present embodiment. FIG. 13 illustrates changes in various signals in the pause period illustrated in FIG. 2.

In the normal mode, the display device according to the present embodiment operates similarly to the display device 10 according to the first embodiment (see FIGS. 5 and 11). In the first full light-emission mode, the display control circuit 12 outputs the gate clocks GCK1, GCK2 and the gate start pulse GSP, which are the same as those in the normal mode (see FIGS. 12 and 13). In the first full light-emission mode, the scanning line drive circuit 13 and the data line drive circuit 14 operate similarly to the normal mode.

During the scanning period and the pause period in the first full light-emission mode, the display control circuit 12 outputs the emission clocks ECK1, ECK2 each having a cycle of 4Tx and fixes the emission start pulse ESP to the high level (see FIGS. 12 and 13). When such emission clocks ECK1, ECK2 and the emission start pulse ESP are supplied to the light-emission control line drive circuit 15 illustrated in FIG. 6, the potentials of the light-emission control lines E1 to Em all go to the high level. At this time, in all the pixel circuits 20 included in the display portion 11, the TFT 23 is turned on, and the organic EL element 24 emits light. Therefore, in the first full light-emission mode, all the organic EL elements 24 always emit light.

In the first full light-emission mode, the light-emission period of the organic EL element 24 is longer than that in the normal mode. Thus, when the data lines S1 to Sn are driven in the first full light-emission mode using the same potential as that in the normal mode, the luminance of the display screen becomes higher than that in the normal mode. Therefore, during the scanning period in the first full light-emission mode, the data line drive circuit 14 drives the data lines S1 to Sn using a potential lower than that in the normal mode. The potential lower than that in the normal mode corresponds to a potential that makes the luminance of the organic EL element 24 lower than that in the normal mode. Therefore, by applying a suitable potential to each of the data lines S1 to Sn, the luminance of the display screen can be equalized between the first full light-emission mode and the normal mode.

As described above, the display device according to the present embodiment has the first full light-emission mode. The display control circuit 12 outputs a start pulse (emission start pulse ESP) to the light-emission control line drive circuit 15, and fixes the start pulse to a level (high level) at which all the light-emitting elements (organic EL elements 24) emit light in the first full light-emission mode. During the scanning period in the first full light-emission mode, the data line drive circuit 14 drives the data lines S1 to Sn using a potential that makes the luminance of the light-emitting element lower than that at the normal time (normal mode).

According to the display device of the present embodiment, in the first full light-emission mode, by fixing the start pulse and fixing the potentials of the light-emission control lines E1 to Em, the power consumption of the display device during the pause period can be reduced. Further, in the first full light-emission mode, the luminance of the light-emitting element is made lower than that at the normal time, so that the luminance of the display screen can be equalized between the first full light-emission mode and the normal time.

Third Embodiment

A display device according to a third embodiment has the same configuration as the display device 10 according to the first embodiment (see FIGS. 1, 4, 6, 7 and 9). The display device according to the present embodiment has a full light-emission mode (hereinafter referred to as a second full light-emission mode) in which all the organic EL elements 24 are caused to emit light, in addition to a normal mode in which the display device operates similarly to the display device 10 according to the first embodiment. Hereinafter, the operation of the display device according to the present embodiment in the second full light-emission mode will be described.

Figure 14:
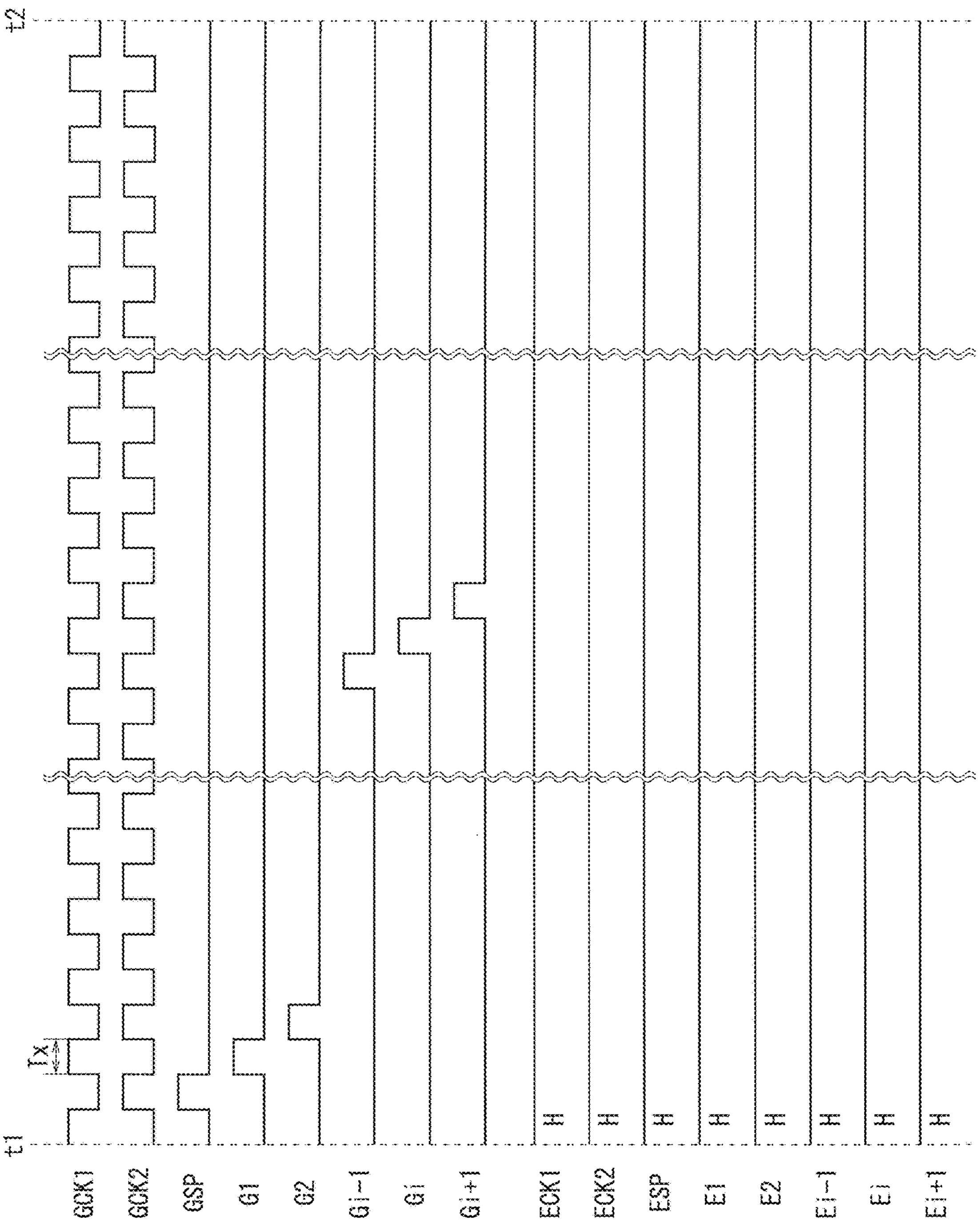
FIG. 14 is a timing chart for a scanning period of a display device according to a third embodiment.
Figure 15:
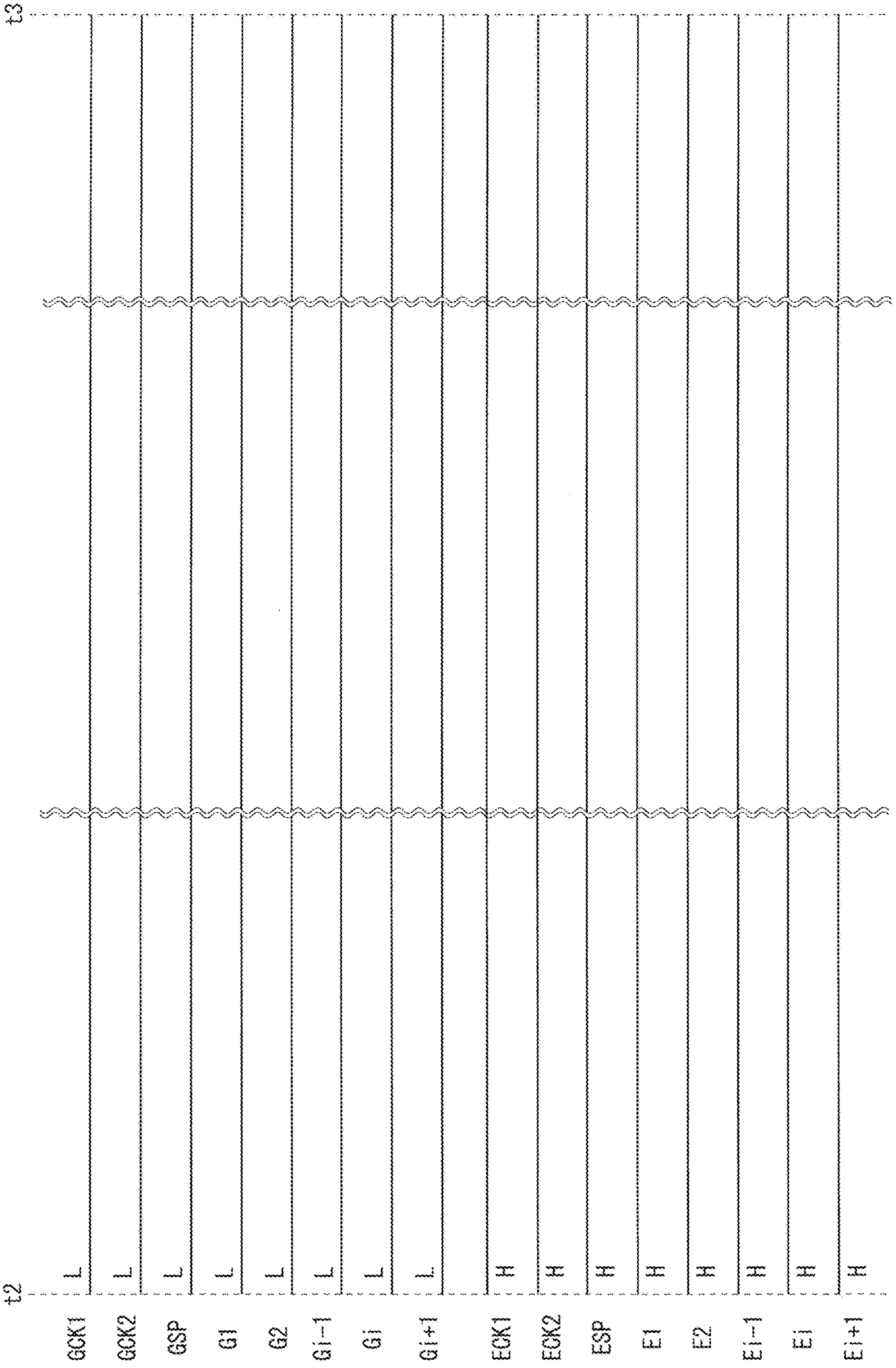
FIG. 15 is a timing chart for a pause period of the display device according to the third embodiment.

FIG. 14 is a timing chart for the scanning period in the second full light-emission mode of the display device according to the present embodiment. FIG. 14 illustrates changes in various signals during the scanning period from time t1 to time t2 illustrated in FIG. 2. FIG. 15 is a timing chart for the pause period in the second full light-emission mode of the display device according to the present embodiment. FIG. 15 illustrates changes in various signals during the pause period illustrated in FIG. 2.

In the normal mode, the display device according to the present embodiment operates similarly to the display device 10 according to the first embodiment (see FIGS. 5 and 11). In the second full light-emission mode, the display control circuit 12 outputs the gate clocks GCK1, GCK2 and the gate start pulse GSP, which are the same as those in the normal mode (see FIGS. 14 and 15). In the second full light-emission mode, the scanning line drive circuit 13 and the data line drive circuit 14 operate similarly to the normal mode.

During the scanning period and the pause period in the second full light-emission mode, the display control circuit 12 fixes the emission clocks ECK1, ECK2 and the emission start pulse ESP to the high level (see FIGS. 14 and 15). When such emission clocks ECK1, ECK2 and the emission start pulse ESP are supplied to the light-emission control line drive circuit 15 illustrated in FIG. 6, the potentials of the light-emission control lines E1 to Em all go to the high level. At this time, in all the pixel circuits 20 included in the display portion 11, the TFT 23 is turned on, and the organic EL element 24 emits light. Therefore, in the second full light-emission mode, all the organic EL elements 24 always emit light.

Similarly to the scanning period in the first full light-emission mode, during the scanning period in the second full light-emission mode, the data line drive circuit 14 drives the data lines S1 to Sn using a potential lower than that in the normal mode. The potential lower than that in the normal mode corresponds to a potential that makes the luminance of the organic EL element 24 lower than that in the normal mode. Therefore, by applying a suitable potential to each of the data lines S1 to Sn, the luminance of the display screen can be equalized between the second full light-emission mode and the normal mode.

As described above, the display device according to the present embodiment has the second full light-emission mode. The display control circuit 12 outputs a start pulse (emission start pulse ESP) to the light-emission control line drive circuit 15 and fixes the second clock signal (emission clocks ECK1, ECK2) and the start pulse to a level (high level) at which all the light-emitting elements (organic EL elements 24) emit light in the second full light-emission mode. During the scanning period in the second full light-emission mode, the data line drive circuit 14 drives the data lines S1 to Sn using a potential that makes the luminance of the light-emitting element lower than that at the normal time (normal mode).

According to the display device of the present embodiment, in the second full light-emission mode, by fixing the second clock signal and the start pulse and fixing the potentials of the light-emission control lines E1 to Em, the power consumption of the display device during the pause period can be reduced. Further, in the second full light-emission mode, the luminance of the light-emitting element is made lower than that at the normal time, so that the luminance of the display screen can be equalized between the second full light-emission mode and the normal time.

Figure 16:
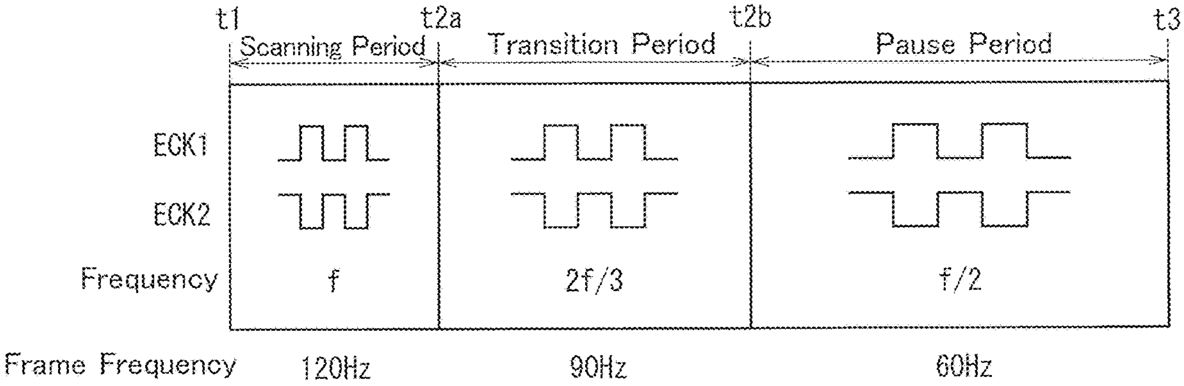
FIG. 16 is a schematic diagram illustrating an emission clock in a display device according to a first modification.

The display devices according to the first to third embodiments can constitute various modifications. When switching between the scanning period and the pause period, the display control circuit 12 may change the frequency of the second clock signal (emission clocks ECK1, ECK2) stepwise in units of frame periods (first modification). FIG. 16 is a schematic diagram illustrating emission clocks ECK1, ECK2 of a display device according to the first modification. In the example illustrated in FIG. 16, a period from time t1 to time t2a is a scanning period, and a period from time t2b to time t3 is a pause period. A transition period (a period from time t2a to time t2b) is provided between the scanning period and the pause period. The frame frequency of the scanning period is 120 Hz, the frame frequency of the transition period is 90 Hz, and the frame frequency of the pause period is 60 Hz. When the frequencies of the emission clocks ECK1, ECK2 during the scanning period are f, the frequencies of the emission clocks ECK1, ECK2 during the transition period are 2f/3, and the frequencies of the emission clocks ECK1, ECK2 during the pause period are f/2.

According to the display device of the first modification, at the time of switching between the scanning period and the pause period, the frequency of the second clock signal is changed stepwise in units of frame periods, whereby deterioration in image quality of the display image due to the change in frequency of the second clock signal can be reduced.

Figure 17:
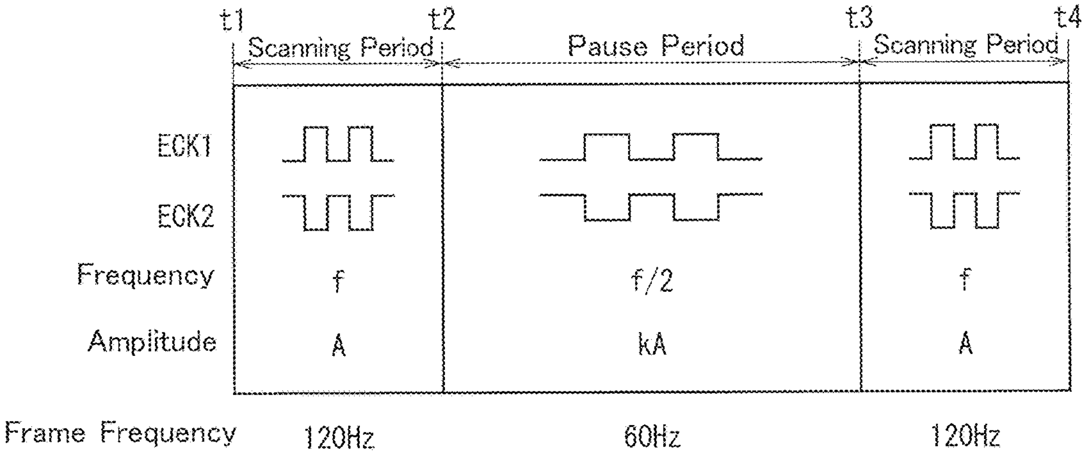
FIG. 17 is a schematic diagram illustrating an emission clock in a display device according to a second modification.

During the pause period, the display control circuit 12 may make the amplitude of the second clock signal (emission clocks ECK1, ECK2) smaller than that during the scanning period (second modification). FIG. 17 is a schematic diagram illustrating emission clocks ECK1, ECK2 of a display device according to a second modification. In the example illustrated in FIG. 17, a period from time t1 to time t2 and a period from time t3 to time t4 are scanning periods, and a period from time t2 to time t3 is a pause period. In the example illustrated in FIG. 17, when the amplitudes of the emission clocks ECK1, ECK2 during the scanning period are A, the amplitudes of the emission clocks ECK1, ECK2 during the pause period are kA (where $0<k<1$). For example, the display control circuit 12 may make the high-level potentials of the emission clocks ECK1, ECK2 lower than those during the scanning period, during the pause period.

During the pause period, the frequencies of the emission clocks ECK1, ECK2 are lower than those during the scanning period. Thus, even when the amplitudes of the emission clocks ECK1, ECK2 during the pause period are made smaller than those during the scanning period, the emission clocks ECK1, ECK2 reach a level at which the TFT 23 in the pixel circuit 20 is turned on within a predetermined time. Further, during the pause period, the amplitudes of the emission clocks ECK1, ECK2 are made smaller than those during the scanning period, whereby the fluctuation of the potentials of the light-emission control lines E1 to Em during the pause period can be reduced, and the power consumption of the display device during the pause period can be reduced.

According to the display device of the second modification, during the pause period, the amplitude of the second clock signal (emission clocks ECK1, ECK2) is made smaller than that of the scanning period, whereby the fluctuation of the potential of the light-emission control lines E1 to Em during the pause period can be reduced, and the power consumption of the display device during the pause period can be reduced.

The display device according to a modification may include an optional pixel circuit capable of controlling the light-emitting state of the light-emitting element. In the display device according to a modification, the characteristic compensation of the drive transistor may be performed inside the pixel circuit, or the characteristic compensation of the drive transistor may be performed outside the pixel circuit. The display device according to a modification may include an optional light-emission control line drive circuit that drives the light-emission control lines by sequentially delaying the emission start pulse based on the multi-phase emission clock.

In the preferred embodiment of the present invention in FIG. 1, one scanning line drive circuit 13 and one light-emission control line drive circuit 15 are preferably provided along one side (left side) of the display portion 11. Here, the scanning lines G1 to Gm are preferably driven from the left end using the scanning line drive circuit 13, and the light-emission control lines E1 to Em are preferably driven from the left end using the light-emission control line drive circuit 15. Alternatively, another preferred embodiment of the present invention preferably includes one scanning line drive circuit and one light-emission control line drive circuit may be provided along each of two opposing sides of the display portion 11. In the other preferred embodiment of the present invention, the scanning lines G1 to Gm are preferably driven from both ends using two scanning line drive circuits, and the light-emission control lines E1 to Em are preferably driven from both ends using two light-emission control line drive circuits.

Although the organic EL display device provided with the pixel circuit including the organic EL element (organic light-emitting diode) has been described as an example of the display device provided with the pixel circuit including the light-emitting element, an inorganic EL display device provided with a pixel circuit including an inorganic light-emitting diode, a quantum-dot light-emitting diode (QLED) display device provided with a pixel circuit including a quantum dot light-emitting diode, or a light-emitting diode (LED) display device provided with a pixel circuit including a mini LED or a micro LED may be configured by a similar method. The features of the display devices described above may be arbitrarily combined as long as the features are not contrary to the nature thereof to constitute a display device having the features of the above embodiments and modifications together.

DESCRIPTION OF REFERENCE CHARACTERS

10: DISPLAY DEVICE
11: DISPLAY PORTION
12: DISPLAY CONTROL CIRCUIT
13: SCANNING LINE DRIVE CIRCUIT
14: DATA LINE DRIVE CIRCUIT
15: LIGHT-EMISSION CONTROL LINE DRIVE CIRCUIT
20: PIXEL CIRCUIT
21 to 23, 31 to 34, 41 to 51: TFT
24: ORGANIC EL ELEMENT
25, 35, 52, 53: CAPACITOR
30, 40: UNIT CIRCUIT

The invention claimed is:

1. A display device comprising:
a plurality of scanning lines;
a plurality of data lines;
a plurality of light-emission control lines;
a plurality of pixel circuits each including a light-emitting element;
a scanning line drive circuit configured to drive the scanning lines based on a first clock signal;
a data line drive circuit configured to drive the data lines;
a light-emission control line drive circuit configured to drive the light-emission control lines based on a second clock signal; and
a display control circuit configured to output at least the first clock signal and the second clock signal,
wherein the display control circuit classifies a frame period into a scanning period and a pause period, and during the pause period, the display control circuit stops the first clock signal and makes a frequency of the second clock signal lower than during the scanning period.

2. The display device according to claim 1, having a first full light-emission mode,
wherein the display control circuit outputs a start pulse to the light-emission control line drive circuit and fixes the start pulse to a level at which all of the light-emitting elements emit light in the first full light-emission mode.

3. The display device according to claim 2, wherein during the scanning period in the first full light-emission mode, the data line drive circuit drives the data lines using a potential that makes luminance of the light-emitting elements lower than at a normal time.

4. The display device according to claim 1, having a second full light-emission mode,
wherein the display control circuit outputs a start pulse to the light-emission control line drive circuit, and fixes the second clock signal and the start pulse to a level at which all the light-emitting elements emit light in the second full light-emission mode.

5. The display device according to claim 4, wherein during the scanning period in the second full light-emission mode, the data line drive circuit drives the data lines using a potential that makes luminance of the light-emitting elements lower than at a normal time.

6. The display device according to claim 1, wherein the display control circuit changes the frequency of the second clock signal stepwise in units of frame periods when switching between the scanning period and the pause period.

7. The display device according to claim 1, wherein during the pause period, the display control circuit makes an amplitude of the second clock signal smaller than during the scanning period.

8. The display device according to claim 1, wherein the light-emitting element is an organic electroluminescent element.

9. A method for driving a display device provided with a plurality of scanning lines, a plurality of data lines, a plurality of light-emission control lines, and a plurality of pixel circuits each including a light-emitting element, the method comprising:
a step of driving the scanning lines based on a first clock signal;
a step of driving the data lines;
a step of driving the light-emission control lines based on a second clock signal; and
a display control step of outputting at least the first clock signal and the second clock signal,
wherein the display control step includes classifying a frame period into a scanning period and a pause period, stopping the first clock signal during the pause period, and making a frequency of the second clock signal lower during the pause period than during the scanning period.

10. The method for driving a display device according to claim 9, wherein
the display device has a first full light-emission mode, and
the display control step further includes outputting a start pulse for the step of driving the light-emission control line, and fixing the start pulse to a level at which all of the light-emitting elements emit light in the first full light-emission mode.

11. The method for driving a display device according to claim 10, wherein the step of driving the data lines is adapted to drive the data lines using a potential that makes luminance of the light-emitting elements lower than at a normal time, during the scanning period in the first full light-emission mode.

12. The method for driving a display device according claim 9, wherein the display device has a second full light-emission mode, and the display control step further includes outputting a start pulse for the step of driving the light-emission control line, and fixing the second clock signal and the start pulse to a level at which all of the light-emitting elements emit light in the second full light-emission mode.

13. The method for driving a display device according to claim 12, wherein the step of driving the data lines is adapted to drive the data lines using a potential that makes luminance of the light-emitting elements lower than at a normal time, during the scanning period in the second full light-emission mode.

14. The method for driving a display device according to claim 9, wherein the display control step further includes changing the frequency of the second clock signal stepwise in units of frame periods when switching between the scanning period and the pause period.

15. The method for driving a display device according to claim 9, wherein the display control step further includes making an amplitude of the second clock signal smaller during the pause period than during the scanning period.

16. The method for driving a display device according to claim 9, wherein the light-emitting element is an organic electroluminescent element.

* * * * *